United States Patent [19]

Hochsprung et al.

[11] Patent Number: 4,661,902
[45] Date of Patent: Apr. 28, 1987

[54] LOCAL AREA NETWORK WITH CARRIER SENSE COLLISION AVOIDANCE

[75] Inventors: Ronald R. Hochsprung, Saratoga; Lawrence A. Kenyon, Jr., Sunnyvale; Alan B. Oppenheimer, Cupertino; Gursharan S. Sidhu, Menlo Park, all of Calif.

[73] Assignee: Apple Computer, Inc., Cupertino, Calif.

[21] Appl. No.: 715,065

[22] Filed: Mar. 21, 1985

[51] Int. Cl.⁴ .............................................. G06F 15/16
[52] U.S. Cl. .................................................... 364/200
[58] Field of Search ... 364/200 MS File, 900 MS File

[56] References Cited

U.S. PATENT DOCUMENTS 4,547,850 10/1985 Genma ................................ 364/200

*Primary Examiner*—Raulfe B. Zache
*Attorney, Agent, or Firm*—Blakely Sokoloff Taylor & Zafman

[57] ABSTRACT

A local area network is disclosed including apparatus and methods for transferring data between a plurality of data processing resources ("agents") coupled to a cable. In the preferred embodiment, a plurality of agents are coupled to a common cable for data transmission and reception. An agent newly coupled to the cable dynamically assigns itself a unique address on the cable to which other agents may send data. Once an agent has been assigned a final address, it may then transmit to, and receive data from, other agents on the cable. An agent desiring to send data to a receiving agent follows a three step handshake, wherein the sending agent transmits an "RTS" signal and within a predetermined time must receive a "CTS" signal from the receiving agent. The sending agent then transmits a data frame within a predetermined time after the CTS signal is received. The failure to detect a return CTS signal within the predetermined time denotes a collision condition. Retransmission is attempted using a linear back off method which is adjusted based on previous cable traffic history.

38 Claims, 15 Drawing Figures

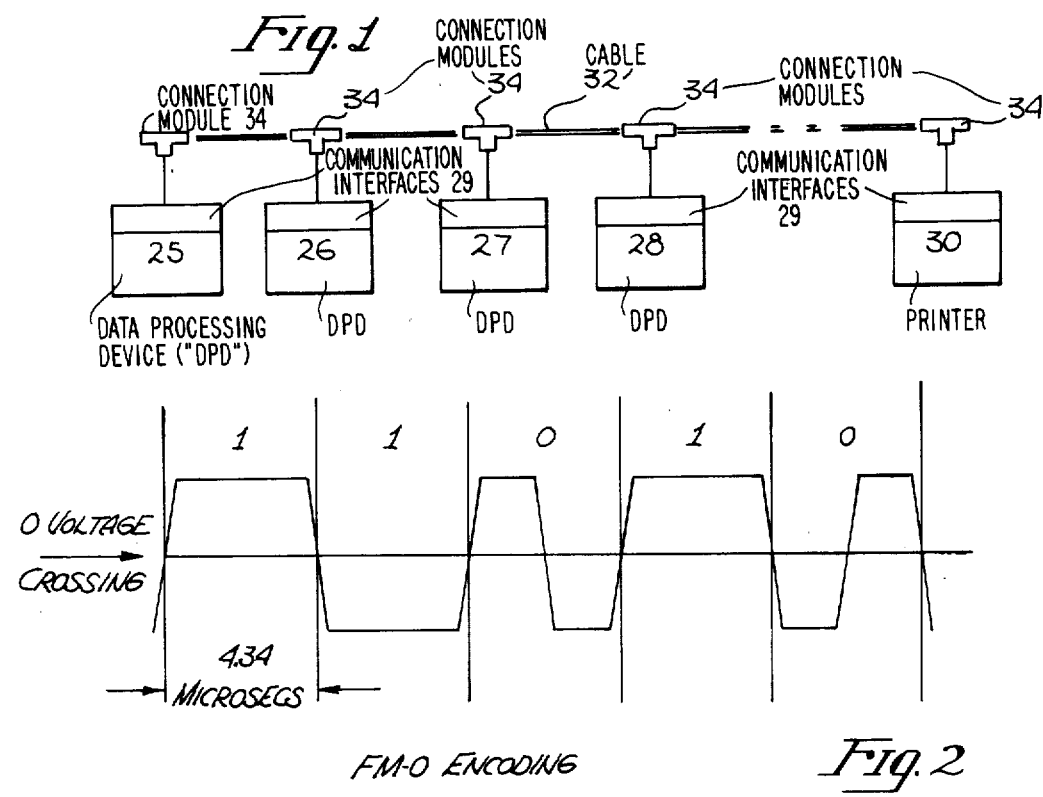
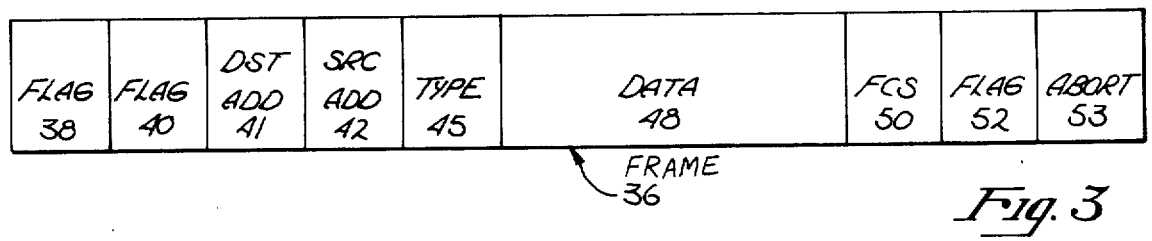
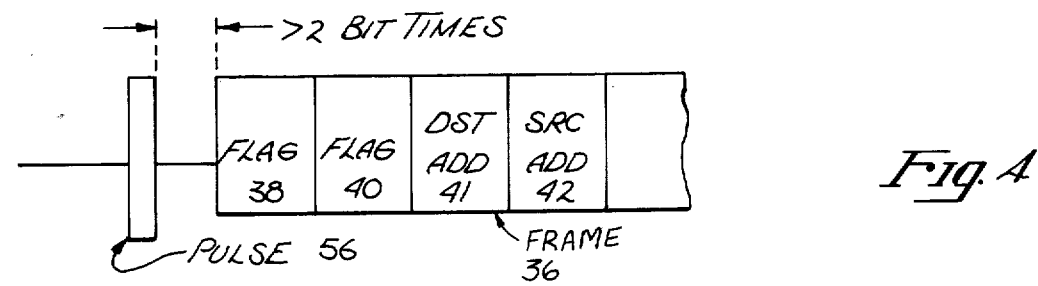
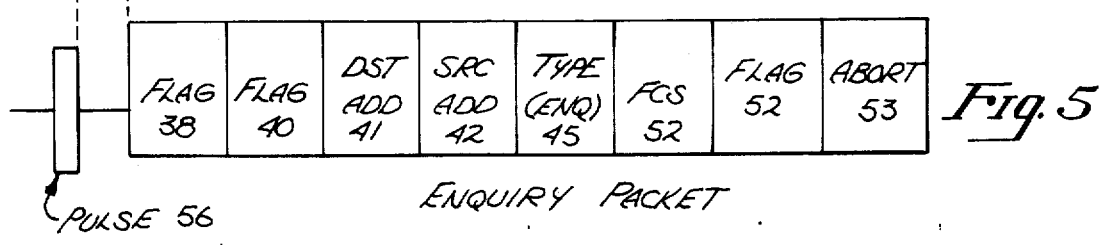

DEFERENCE (W/TWO TRANSMITTERS)

COLLISION (AND RESOLUTION)

LOCAL AREA NETWORK WITH CARRIER SENSE COLLISION AVOIDANCE

The present application has been filed concurrently with, and is related to, U.S. patent application, Ser. No. 06/715,066, filed Mar. 21, 1985, and hereby refers to, and incorporates by reference the contents of the above-referenced application.

BACKGROUND OF THE INVENTION

1. Field of the Invention

The present invention relates to apparatus and methods for transferring data between a source and a plurality of receiving data processing devices. More particularly, the present invention relates to data transfer along a local area network between a plurality of data processing and peripheral devices.

2. Art Background

In the computing industry, it is quite common to transfer data and commands between a plurality of data processing devices, such as for example, computers, printers, memories and the like. The interconnection of computers and other peripheral devices principally developed in the early 1970's with the advent of computer networking systems, which permitted the distribution of access to computing resources beyond the immediate proximity of a main frame computer. Networks, such as the ARPA Network, were developed to provide access by various users to large time-sharing systems and the transfer of data between such systems. In the case of geographically local networks, so called "local area networks" (LANs) were developed to connect together a collection of computers, terminals and peripherals located, typically in the same building or adjacent buildings, and permitted each of these devices to communicate among themselves or with devices attached to other networks. Local area networks permit the implementation of distributed computing. In other words, some of the devices coupled to the local area network may be dedicated to perform specific functions, such as file storage, data base management, terminal handling, and so on. By having different machines perform different tasks, distributed computing can make the implementation of the system simpler and more efficient.

Local area networks differ from their long-haul cousins in a number of respects. A key difference is that the designers of long-haul networks, such as the ARPA network, are often forced by economic or legal reasons to use the public telephone network, regardless of its technical suitability. In contrast, most local area networks utilize their own high-bandwidth cable to permit datagram service between the various devices coupled to the LAN. The most common transmission media for carrier sense local area networks are co-axial cable, twisted pair and fiber optics. A variety of cable topologies are possible, such as linear, spine, tree, ring and segmented. In addition, local area networks do not suffer from the long propagation delays which are inherent with other large networks, thus allowing the channel utilization to be pushed significantly above the capabilities of large scale networks.

Although local area networks hold the promise of distributed processing and communication between data processing devices, a number of factors have prevented wider use and acceptance of local area networks, such as ETHERNET (U.S. Pat. No. 4,063,220). For example, despite efforts to lower costs using VLSI technology, a typical LAN node may represent a significant percentage of the total cost of a personal computer. Accordingly, in the personal computer market local area networks have been prohibitively expensive to implement. In addition, most local area networks utilize complex cabling techniques and require a system administrator who is trained in the installation, updating and maintainence of the LAN system. Moreover, many local area networks utilize relatively complex protocols to permit the various devices coupled to the LAN to communicate under various conditions.

As will be described, the present invention provides a local area network for communication and resource sharing among various computers, servers, disks, printers, modems and other data processing devices. The present invention supports a wide variety of local area network services, and permits communication to larger networks through the use of bridging devices. The present invention provides an economical, reliable, and mechanically simple local area network heretofore unknown in the prior art.

SUMMARY OF THE INVENTION

A local area network is disclosed including apparatus and methods for transferring data between a plurality of data processing resources ("agents") coupled to a cable. In the preferred embodiment, a plurality of agents are coupled to a common cable for data transmission and reception. An agent newly coupled to the cable dynamically assigns itself a unique address on the cable to which other agents may send data. The agent generates a random number within a predetermined range, or retrieves a previously stored initial number ("hint"), for use as a tentative address. The agent transmits an enquiry signal (ENQ) over the cable to the tentative address to determine if the tentative address is currently being used by another agent. If an acknowledge (ACK) signal is received by the sending agent in response to the ENQ signal, another random number is generated as a tentative address and additional ENQ signals are sent. In the event no ACK signal is received, the sending agent assigns the tentative address as a final address in its memory.

Once an agent has assigned itself a final address, it may then transmit to, and receive data from, other agents on the cable. An agent desiring to send data to a receiving agent senses the cable to determine if the cable is idle or in use. If the cable is in use, the agent "defers" until an idle condition is sensed. Once the cable is detected as idle, the sending agent waits a predetermined period plus a random time before transmitting an "RTS" signal to the receiving agent. The sending agent then monitors the cable for a "CTS" signal, which must be transmitted by the receiving agent to the sending agent within a predetermined time (IFG) after the receipt of the RTS signals. If a CTS signal is properly received, the sending agent may then transmit a data frame to the receiving agent within an IFG time after receipt of the CTS signal. The failure to detect a return CTS signal within an IFG time period denotes a collision condition. If collision is presumed, the present invention attempts to re-transmit an RTS signal using a backoff method which dynamically adjusts the period before a re-transmission attempt based on recent cable traffic history. Accordingly, the present invention provides a method of minimizing collisions and permits reliable and economical data transfers between a plurality of agents coupled to the common cable.

BRIEF DESCRIPTION OF THE DRAWINGS

FIG. 1 illustrates a local area network adapted to utilize the teachings of the present invention.

FIG. 2 is a timing diagram illustrating the present invention's use of frequency modulated (FM-0) encoding.

FIG. 3 illustrates the frame format utilized by the present invention to transfer data to various data processing devices coupled to the local area network.

FIG. 4 illustrates the present invention's use of a synchronization pulse prior to the transmission of a frame.

FIG. 5 illustrates an enquiry (ENQ) frame utilized by the present invention during dynamic address assignment.

DETAILED DESCRIPTION OF THE INVENTION

Figure 6:
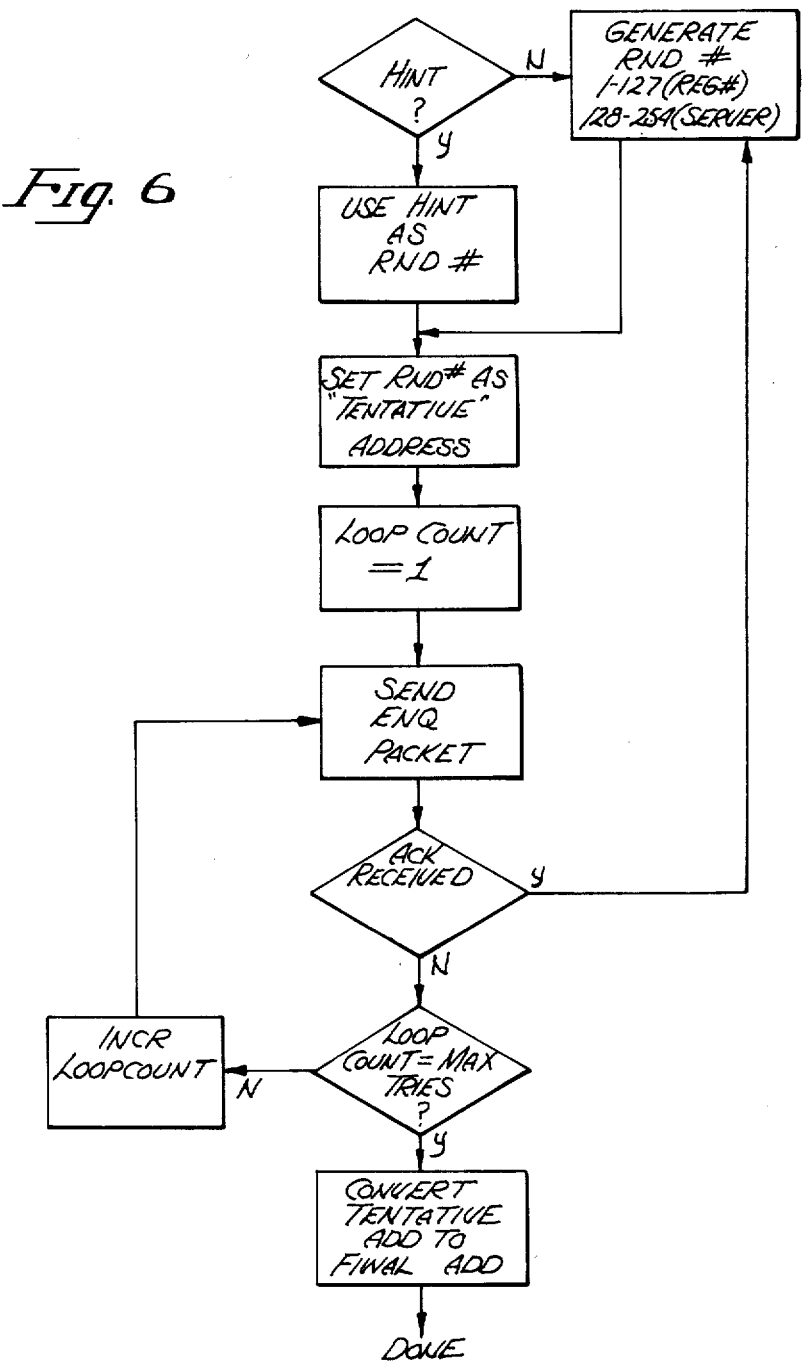
FIG. 6 is a flow chart illustrating the sequence of operations utilized by a data processing device coupled to the present invention during dynamic address assignment.

A local area network including apparatus and methods for transferring data between a plurality of data processing resources coupled to a common cable is disclosed. In the following description for purposes of explanation, specific numbers, bytes, registers, addresses, times, signals, and formats, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Referring to FIG. 1, the present invention may include a plurality of data processing devices ("DPD") identified generally by the numerals 25 through 28 as well as peripheral devices such as printer 30 (or other devices such as, for example, a global memory, a disk drive and the like). For purposes of this Specification, all data processing and peripheral devices which are coupled to the present invention's local area network are collectively referred to as "agents". As shown, processing devices 25, 26, 27, 28 and printer 30 are interconnected for data transfer to one another by a common cable 32. As shown in FIG. 1, each agent includes a communication interface 29 which is coupled to the agent and to common cable 32 through connection modules 34, connection modules 34, which in the presently preferred embodiment, contain a passive coupling transformer, resistive and capacitive circuits, and are known in the art for coupling each of the data processing and other devices to cable 32. Communication interface 29 comprises circuitry, logic and software, known in the art for sensing cable 32 to determine if it is clear of carrying data of another agent. In addition, communication interface 29 includes known circuitry and logic to transmit and receive data on cable 32, as well as provide timing, random number generation, and signal generation for implementing the teachings of the present invention as described herein. For purposes of clarity, the specific circuits, programming routines, and other logic comprising communication interface 29 will not be disclosed in the Specification, as means for accomplishing its functions as defined in this patent are known in the art. Cable 32 is appropriately terminated to eliminate signal reflections. In the preferred embodiment, cable 32 is terminated with 100 Ohm resistors, and is comprised of a twisted pair cable. It will be appreciated by one skilled in the art that cable 32 may comprise any shared media, such as coaxial cable, fiber optics, radio channel and the like. Since, in the present embodiment, the agents are passively coupled to cable 32, a failure of an agent or a connection module will not disrupt communication over cable 32.

As will be described, the present invention provides a local area network permitting synchronous serial communication and data transfer between data processing devices 25 through 28, and other peripheral devices such as printer 30, utilizing protocols and collision avoidance and detection methods and apparatus. The present invention's architecture and protocols minimize handshake and collision detection complexities common in prior art systems, and permit high speed serial communication along cable 32. The present invention permits access to various resources coupled to the network, such as data stored in local memories, or disk, and the common use of global printers, without the necessity of complex or active termination circuitry at the cable end, or the need to predefine addresses for each device coupled to cable 32. In the current embodiment, the present invention operates at approximately 230 kilobits per second through a shielded, twisted pair cable 32, and is driven in accordance with EIA standard RS-422 balanced voltage specifications.

Referring to FIG. 2, data is encoded and transmitted on cable 32 using a self-clocking technique known as FM-0 (bi-phase space), such that each bit cell, typically 4.34 microseconds in duration, contains a state transition at its end, thereby providing necessary timing information to the receiver. As illustrated, zeros are encoded by adding an additional zero-crossing transition at mid-cell, such that two zero crossings are detected for each 4.34 microsecond cell. Similarly, a logical one is provided in a particular cell by a zero-crossing transition only at its end. Accordingly, through the use of FM-0 encoding, clocking information is carried by the data signal itself, and permits the present invention to operate in a synchronous mode.

Referring now to FIG. 3, the present invention utilizes a basic unit of data transmission known as a "frame" 36. Frame 36 includes a preamble consisting of two or more synchronization ("flag" bytes 38 and 40. In the presently preferred embodiment, each synchronization byte comprises the bits 01111110. As is known, synchronization bytes 38 and 40 permit receiving data processing unit coupled to cable 32 to synchronize their receiving circuits, and to receive necessary clock information (through the use of FM-0 encoding). Following synchronization bytes 38 and 40 is an eight-bit destination address 41 which specifies the address of the data processing agent for which the frame is intended. A source address 42 comprises an eight-bit address of the data processing agent transmitting the frame of information. A "type" field 45 is provided to specify the type of frame which is transmitted through the use of various codes. For example, type field 45 may designate an acknowledge (ACK) frame, an enquiry (ENQ) frame, as well as an RTS and CTS frame, which will be described more fully below. The type field is followed by a multi-byte data field (possibly of zero length) which may contain raw data, messages, and the like to be transmitted between the agents coupled to cable 32. Following the data field 48 is a 16-bit frame check sequence which is computed as a function of the contents of the source address, destination address, type and data fields. In the present embodiment, the frame check sequence (FCS) is defined using the standard CRC-CCITT polynomial. The frame check sequence 50 is followed by an eight-bit synchronization ("flag") trailer 52 (consisting of the logical bits 01111110), and an abort sequence 53 which consists of eleven or more ones in a row. Abort sequence 53 is used to delineate the end of the frame 36 to agents coupled to cable 32. Frame 36, as will be described, is transmitted along line 32 in a serial synchronous fashion using a handshake sequence of control frames, which are in turn followed by the data frame 36 illustrated in FIG. 3.

Figure 10:
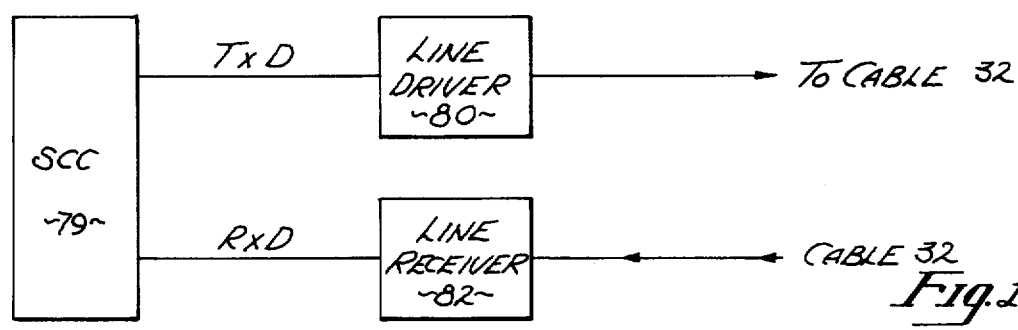
FIG. 10 is a block diagram illustrating the present invention's use of a serial controller device coupled to the local area network.

As shown in FIG. 4, prior to the transmission of a frame, a transmitting agent coupled to cable 32 transmits a synchronization pulse 56 which, is followed by an idle period greater than two bit times and less than 10 bit times. Pulse 56 may comprise any signal containing a zero crossing. In the present embodiment, as illustrated in FIG. 10, each agent coupled to cable 32 utilizes a Zilog Z8530 SCC serial communication controller chip 79, accessing cable 32 through a line driver 80 and a line receiver 82. (See, Zilog Technical Manual, Z8030/Z8530 SCC Serial Communications Controller, January, 1983.) The Z8530 SCC device 79 includes circuitry which searches for synchronization (flag) bits when in a "hunt" mode. As previously discussed, the present invention utilizes a synchronization (flag) byte having the bit states 01111110. In addition, the serial communication controller chip has the capability of detecting a missing clock cycle, and setting a missing clock bit within the device if following a given zero crossing, a predefined period (greater than 1 bit time) elapses without a successive zero crossing of the incoming signal $R_xD$.

The pulse 56 provided by a transmitting agent coupled to cable 32 will be taken as a clock by all receiving agents. However, since it is followed by an idle period greater than two bit times, a missing clock is detected and the missing clock bit is set in the SCC device 79 of each agent connected to cable 32, thereby notifying agents that cable 32 is in use. In the preferred embodiment, the synchronization pulse 56 is obtained by momentarily enabling the line driver 80 for at least one bit time. This causes transmission, for the pulse duration time, of the signal $T_xD$ onto cable 32, thus ensuring at least one zero crossing in the synchronization pulse 56. In addition, the detection of synchronization (flag) bits (i.e., 38 and 40) clears the "hunt" bit in the Z8530 device, and permits each agent coupled to cable 32 to more efficiently detect whether or not cable 32 is currently in use prior to the transmission of a frame, as well as providing the necessary synchronization bits to allow the receiving agent to clock itself to the incoming data frame. It will be appreciated that although the present invention currently uses a Z8530 SCC device for detecting missing clock cycles and synchronization bytes, that other circuitry may equally be used for the same function.

Each agent coupled to cable 32 is identified by a unique binary address along the cable. One feature of the present invention is that an agent coupled to cable 32 does not require a predefined permanent address. Thus, for example, device 27 may be removed from cable 32 and then recoupled to another cable at a different location without need to configure an address. When an agent is newly coupled to cable 32, a unique protocol is followed such that an address is dynamically generated and assigned by the agent itself. In the presently preferred embodiment, the address of each agent is identified using an eight bit identifier (where no agent may have a zero address or an address of 255).

Referring briefly to FIG. 6, the sequence of operations which an agent utilizes in order to determine and assign itself an address is illustrated. It is apparent that to prevent disrupted service, no agent may acquire the same address as an already functioning agent. In practice, the address of agents may be allocated between general data processing devices and "servers" which may comprise main frame or other machines. In the present embodiment, addresses 1 through 127 are allocated for general purpose agents, and addresses 128 through 254 are allocated for use by servers. As shown in FIG. 6, upon being coupled to cable 32, each agent either generates an arbitrary random number within a predefined range or obtains a starting number from some long term, non-volatile memory (for example, read-only-memory or magnetic medium) referred to as a "hint". This random number (or "hint") is treated as a "tentative" address, and the agent then transmits an enquiry (ENQ) frame which utilizes the tentative address as a destination address. The enquiry frame transmitted is of the form illustrated in FIG. 5, and includes an initial pulse 56 separated by at least two bit times prior to the synchronization (flag) bytes 38 and 40, previously described with reference to FIG. 3. The destination address 41 of FIG. 5, as well as the source address 42, contains the tentative address generated randomly or through the hint. It will be noted that the type field 45 in FIG. 5 contains a binary code which identifies the frame of FIG. 5 as an "enquiry" (ENQ) frame for use in address assignment. This ENQ frame is transmitted over cable 32. In the event another agent has previously been assigned the tentative address, the agent already using the tentative address receives the ENQ frame, and in response transmits an acknowledge frame (ACK) back to the transmitting agent. In practice, the ACK frame is structured similarly to the ENQ frame disclosed in FIG. 5, except that the type byte contains a binary code identifying the packet as an ACK.

As illustrated in FIG. 6, in the event that an ACK frame is received by the transmitting agent, that agent must then generate another random number as a tentative address and repeat the transmission of this new tentative address along cable 32. In the event that no ACK frame is received, the agent newly coupled to the cable continues to send ENQ frames onto the cable until some predefined maximum number of tries has occurred. If, after a predefined number of attempts, no ACK frame has been received, the transmitting agent then assigns the tentative address as its final address for all future communication along cable 32. The repeated transmission of ENQ frames is used to avoid instances where a particular agent which may be using the tentative address may currently be busy, and thus miss the reception of an enquiry.

Once an agent has been assigned a final address, it may then communicate with other agents coupled to cable 32 utilizing a handshake protocol and collision avoidance mechanism described below. Referring to FIGS. 7, 8(a), 8(b) and 9, communication between agents coupled to cable 32 occurs through a three-way handshake process. The purpose of the handshake sequence is to control the access to the shared cable 32 in an orderly fashion that reduces the probability of a collision. Each transmission including the handshake (known as a "dialogue") must be separated by a minimum inter-dialogue gap (IDG), which in the present embodiment comprises 400 microseconds. In addition, the frames within a single transmission (dialogue) must follow one another within a maximum interframe gap (IFG) of, in the current embodiment, 200 microseconds. A collision is said to occur when two or more agents transmit at the same time on cable 32.

Figure 7:
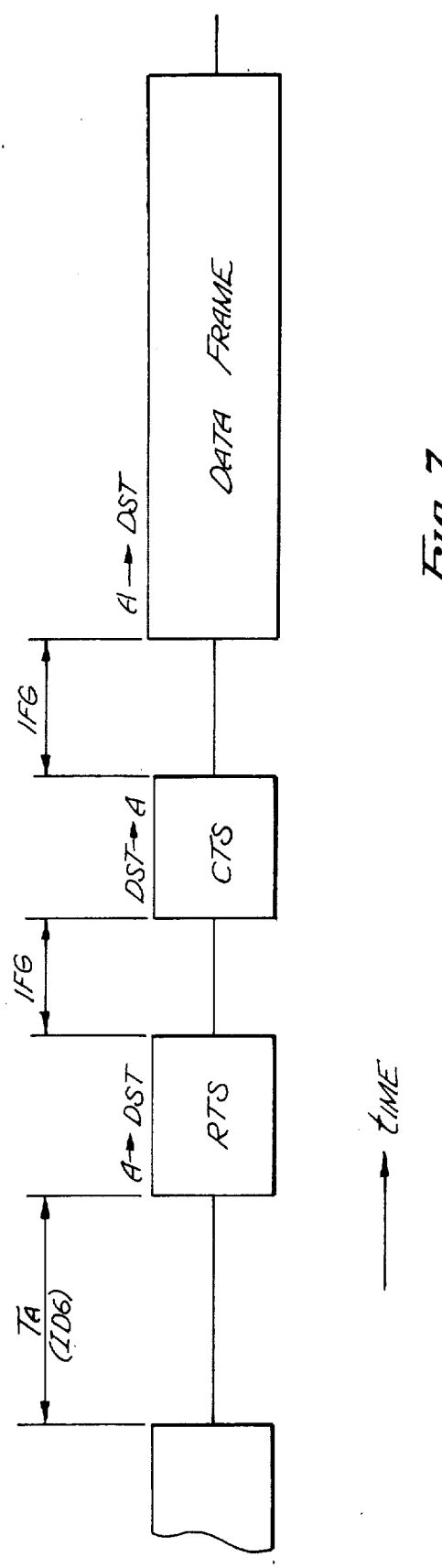
FIG. 7 diagrammatically illustrates the present invention's use of handshake signals between sending and receiving data processing devices prior to the transmission of a data frame.
Figure 8A:
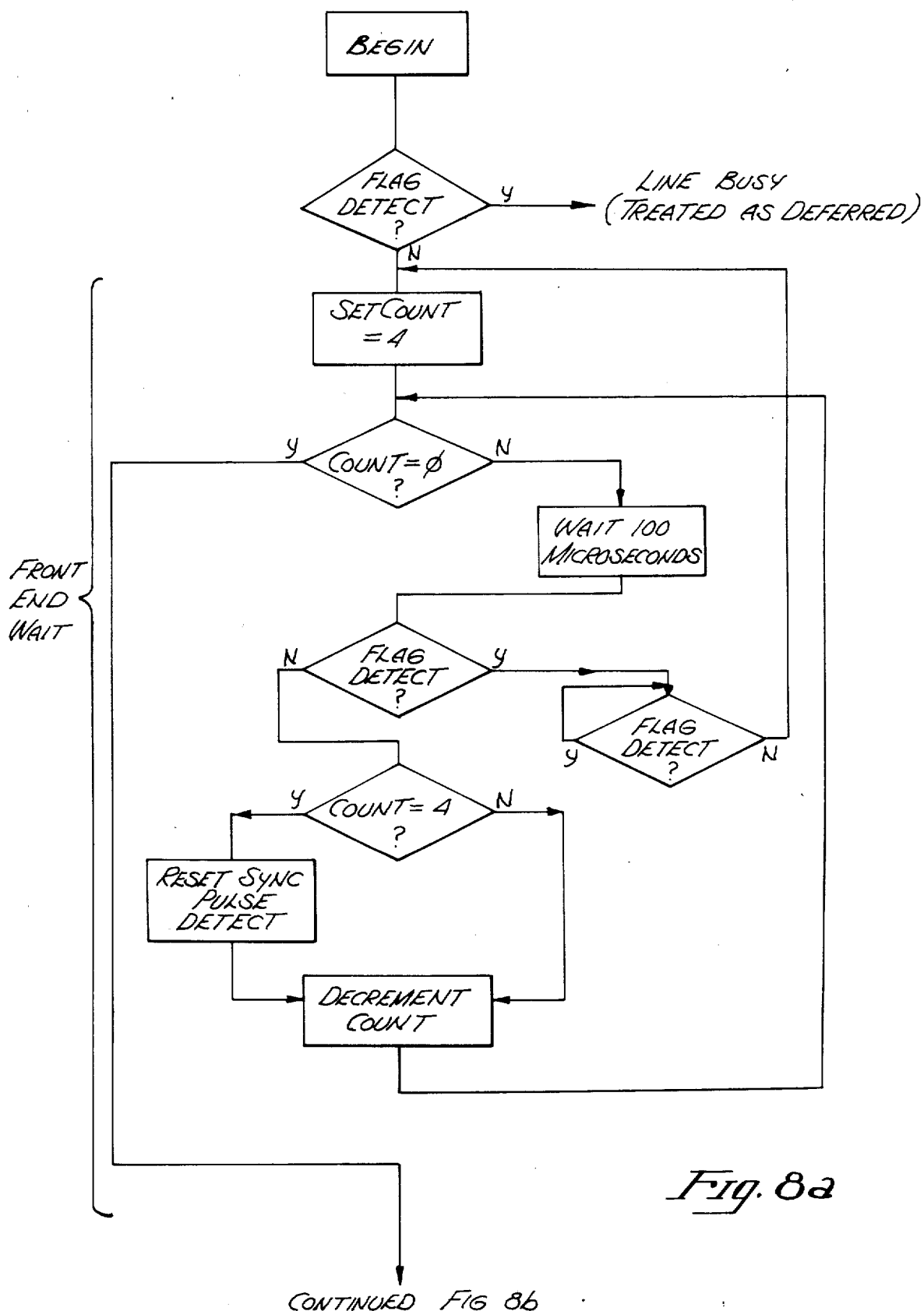
FIGS. 8(a) and 8(b) are a flow chart illustrating the sequence of operations of a sending device to obtain cable access.
Figure 8B:
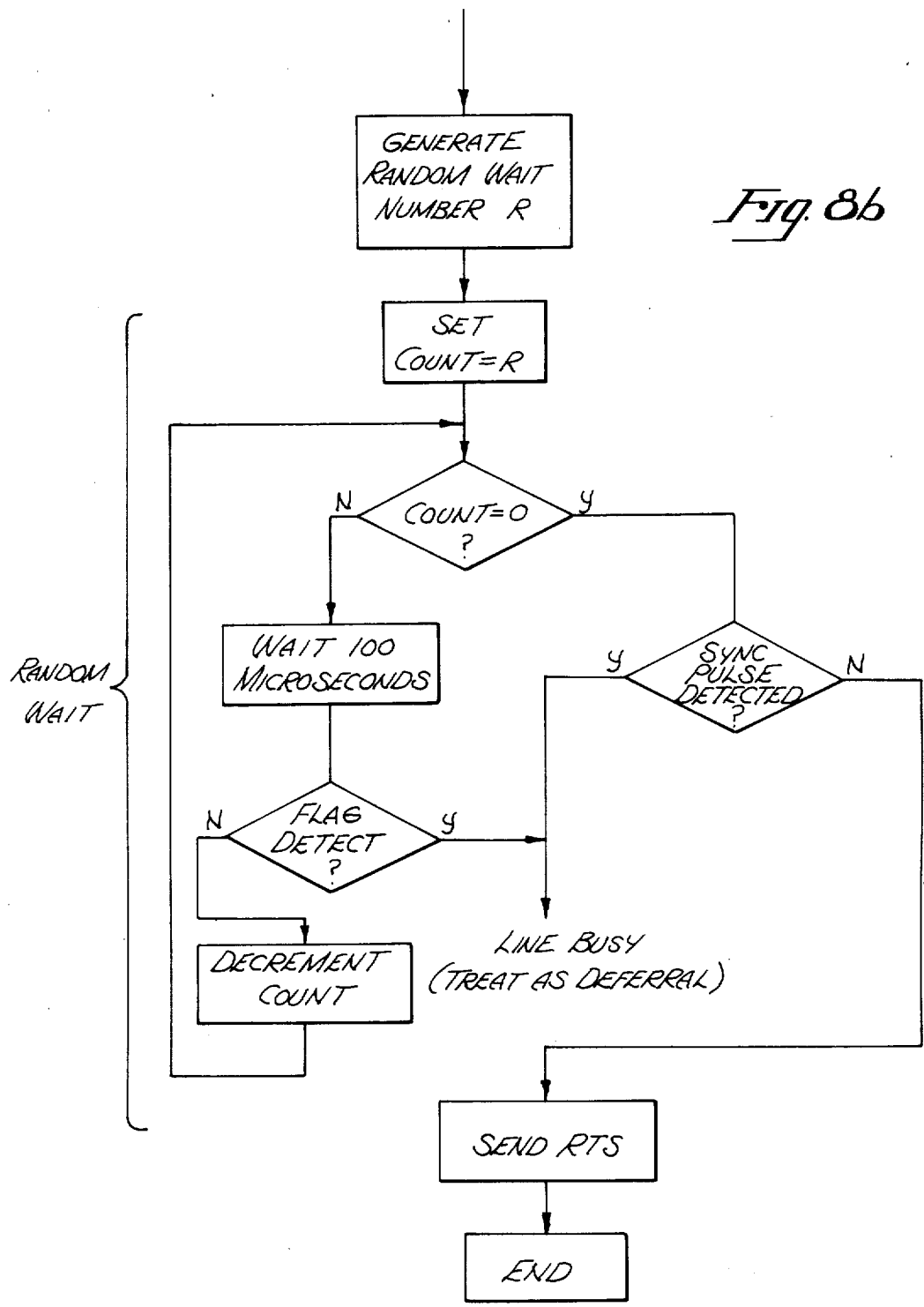

Referring to FIGS. 7 and 8(a) and 8(b), the sending agent, for example data processing agent 25, which desires to communicate with another agent coupled to cable 32, executes the operations set forth in the flow chart of FIGS. 8(a) and 8(b). A sending agent prior to transmission determines whether or not the "hunt" bit in the Z8530 SCC serial controller, or other appropriate hardware, has detected a synchronization (flag) byte passing along cable 32. If a synchronization (flag) byte has been detected, and no abort byte has followed, then cable 32 is currently in use and the agent wishing to transmit "defers" its transmission. In the event that no synchronization pulse 56 or synchronization (flag) bytes (38 and 40) are detected, the agent desiring to transmit data executes a front end wait operation, as best illustrated in FIGS. 8(a). The front end wait operation consists of a series of four waiting periods, in the present embodiment of 100 microseconds each, following each of which the flag detect ("hunt bit") is checked to see if a synchronization (flag) byte has been received on the cable 32. The detection of a flag byte denotes that some other agent is using the cable 32. In such event, the sending agent must wait for the flag detect (hunt bit) to clear, thus signalling the end of utilization of cable 32. At this point, the entire front end wait sequence illustrated in FIGS. 8(a) and 8(b) is repeated.

If, on the other hand, a flag byte is not detected, this indicates that during the front end wait sequence no other agent has attempted to use the cable, and a random wait operation is then executed. In addition, during the front end wait operation, the synchronization pulse detect is cleared after the first 100 microsecond wait.

Before proceeding to execute the random wait operation, illustrated in FIG. 8(b), a random wait number R is generated (the details regarding the generation of R will be discussed below). As shown, the random wait operation cycles R times through a basic operation of waiting 100 microseconds before checking to see if flag has been detected (hunt bit cleared). If, at any point a flag is detected, then another agent is using the cable 32 and the sending agent must defer its transmission. If, however, at the end of the random wait sequence the cable is still quiet (not in use) then one last check is made to see if a synchronization pulse has been detected, before sending an RTS frame, as will be described.

If the cable 32 remains idle throughout this randomly generated waiting period R, the transmitting agent proceeds to transmit a synchronization pulse 56 followed by an "RTS" frame along cable 32 to the receiving agent. An RTS frame is structured substantially the same as the ENQ frame illustrated in FIG. 5, however, the type field contains a binary code identifying the frame as an RTS rather than an ENQ frame. The receiving agent, upon receiving the RTS frame from the transmitting agent, transmits a "CTS" frame back to the original transmitting agent within the maximum interframe gap (IFG) period. As in the case of the RTS frame, a CTS frame transmitted by a receiving agent is structured substantially the same as the ENQ packet illustrated in FIG. 5, except that the type field contains a code identifying the frame as CTS. Once the original transmitting agent, for example data processing unit 25, receives the CTS frame, a full data frame 36, as illustrated in FIG. 3, is transmitted to the receiving agent within one IFG of the receipt of the CTS frame. In the event that the transmission of a CTS or data frame does not occur within an IFG, then the transmitting agent assumes that a collision has occurred or the destination agent is inactive or otherwise unavailable.

If a general broadcast to all agents coupled to cable 32 is desired, the transmitting agent sends an RTS frame with a destination address of 255 to all agents on the line, and waits for an IFG period to elapse prior to sending a data frame 36 also having a destination address of 255. Accordingly, in the case of general broadcasts along cable 32, the transmitting agent does not wait for return CTS frames, but rather, immediately proceeds to conduct a general broadcast once the IFG period has elapsed after transmitting an RTS frame. In addition, by providing within the RTS frame a destination address field 41 having a particular value (255) corresponding to a broadcast address, only one RTS frame need be transmitted to all agents at the various addresses along cable 32.

It will be appreciated by one skilled in the art that the purpose of the three step handshake prototol described above is to avoid collisions by restricting the periods in which collisions are highly likely (typically during the RTS and CTS frame exchanges), and to spread out in time the cable access of transmitters waiting for the cable 32 to become idle prior to the beginning of a transmission. A successful RTS-CTS frame exchange signifies that a collision did not occur, and that all agents desiring to transmit have sensed the coming data frame transmission, and are waiting until the data exchange is complete prior to attempting to gain control of the cable.

Figure 11:
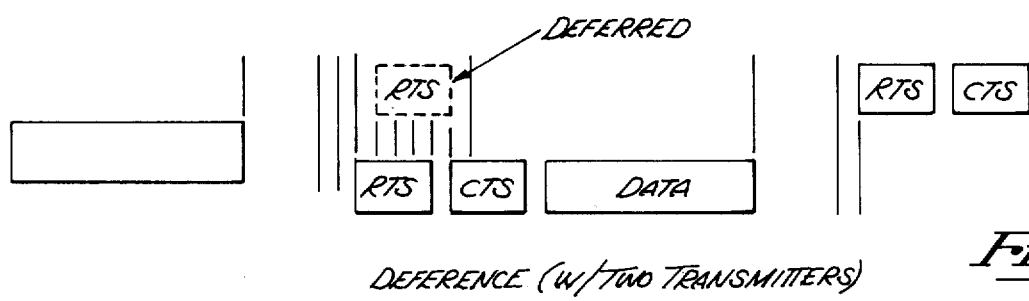
FIG. 11 illustrates the present invention's collision avoidance method including deference.
Figure 12:
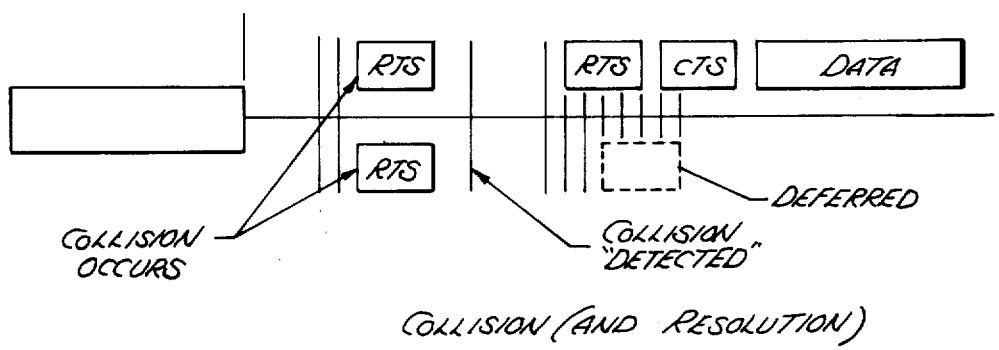
FIG. 12 illustrates the collision and resolution mechanism of the present invention wherein two "RTS" signals collide along the local area network.

In the event that another agent begins a transmission during the RTS-CTS frame exchange described above, it will be appreciated that the CTS frame will not be properly received (e.g. the frame check sequence is invalid), and that the sending agent may then assume that a collision has occurred. A collision will prevent a complete RTS an CTS frame exchange, and thereby prevent a proper handshake from occurring. Normally, if an agent desiring to transmit data on cable 32 senses that the cable is currently in use, it defers the transmission of its own RTS until the cable is idle (see FIGS. 11 and 12).

Figure 9:
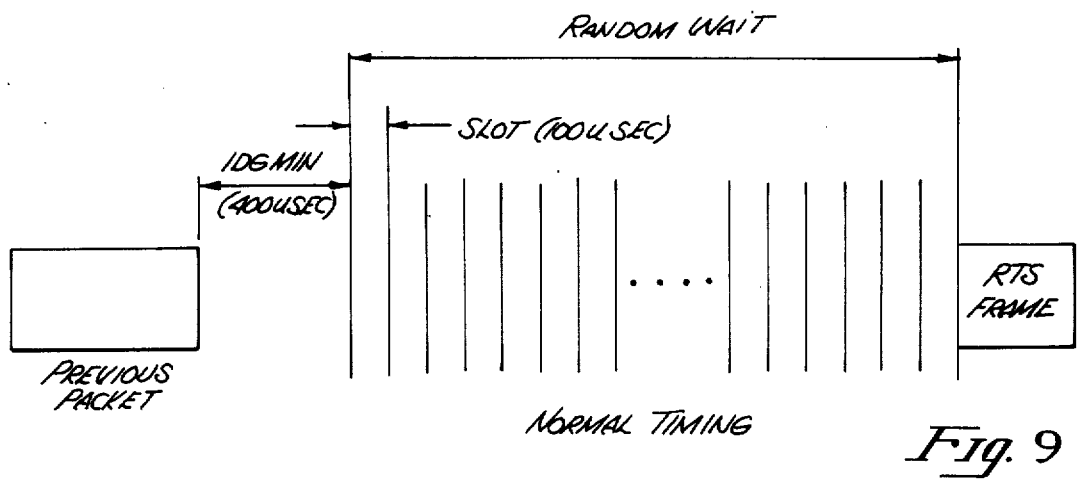
FIG. 9 is a diagrammatical illustration of the transmission of an "RTS" frame by a sending device after sensing an idle cable.
Figure 13A:
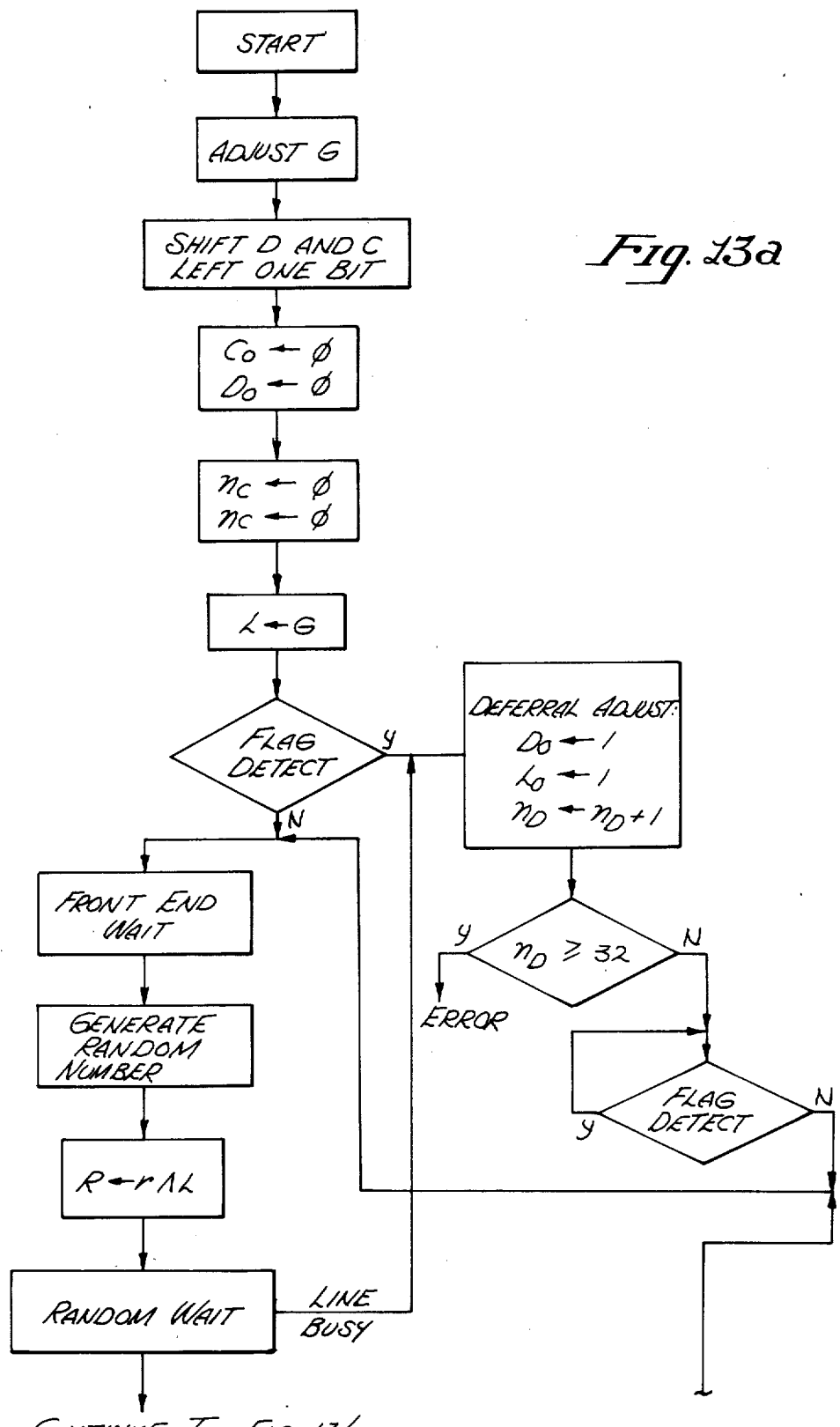
FIGS. 13(a) and 13(b) are a flow chart illustrating the generation of the random wait period R.
Figure 13B:
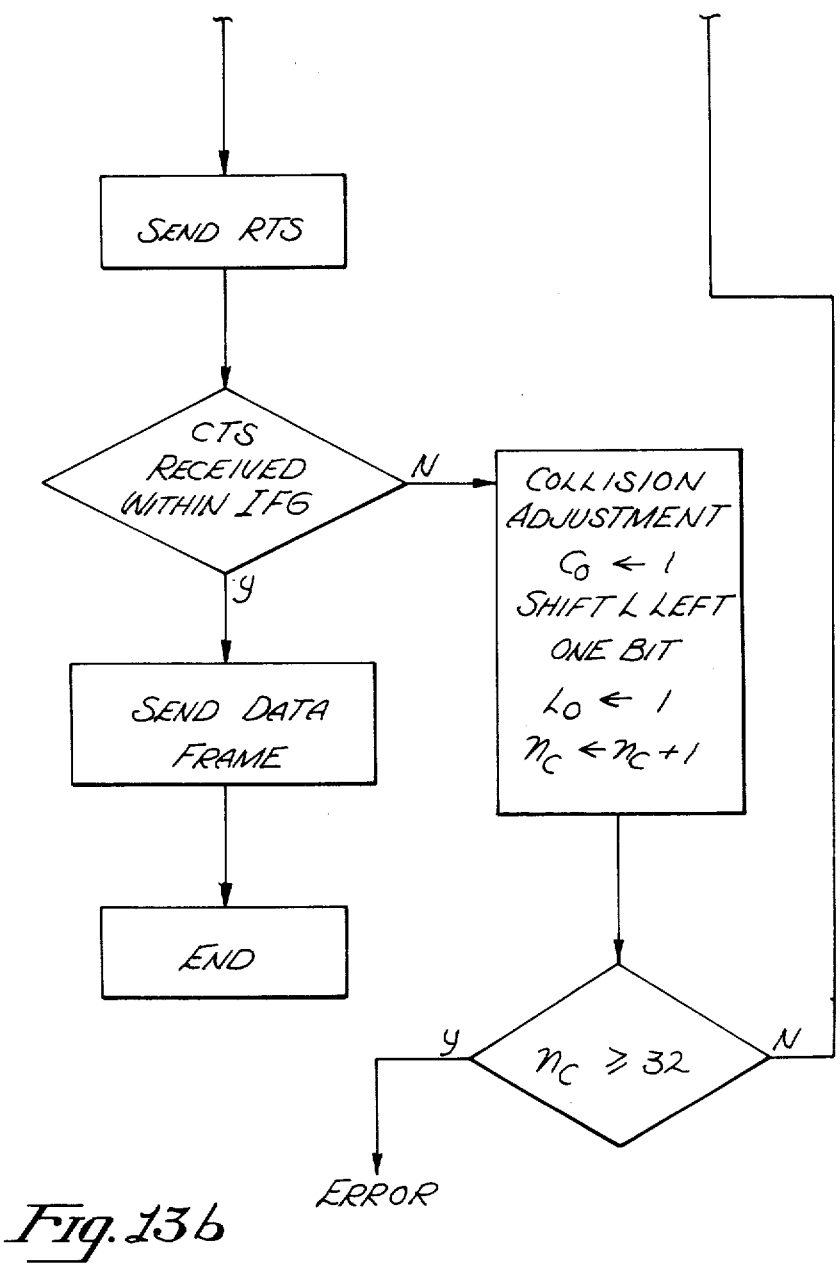

Referring now to FIGS. 9, 13(a) and 13(b), the sequence of operations executed by the present invention to obtain the value of random wait number R (as previously discussed with reference to FIG. 8) will be described in detail. As will be appreciated, the present invention dynamically modifies the random wait number R in response to recent cable traffic history. The method utilized by the present invention presumes that if collisions have been assumed for recently sent data frames, the cable 32 is currently the subject of heavy loading and high bus contention. A random waiting period R prior to retransmission attempt spreads out in time bus access for the various agents contending for cable use. Accordingly, the operations illustrated in FIGS. 13(a) and (b) are executed to generate and adjust the random wait number R utilized in accordance with the sequence of operations set forth in FIGS. 8(a) and (b). In the present invention, eight bit shift registers are provided in order to keep track of collision and deferral histories for each agent coupled to cable 32. For purposes of this Specification, the variable "C" denotes an eight bit shift register which is utilized to keep track of the collision history for the last eight data messages which an agent has attempted to send, and a variable "D" which denotes an eight bit shift register representing the deferral history for the last eight messages which have been attempted to be sent. As previously discussed, a collision is presumed if the RTS-CTS frame handshake protocol fails to occur within the IFG period, and a deferral is deemed to occur if an agent, prior to transmitting a message, detects a flag byte or synchronization pulse 56 thereby indicating that the cable is in use. A variable "G" is defined as a four bit global mask which represents a number signifying a modification factor representative of all previous messages which the the agent has attempted to transmit. A variable "L" is defined as a local mask which is representative of attempts to transmit the current message by an agent coupled to cable 32. In addition, $N_C$ is defined as the number of collisions which have been assumed for a particular data packet, and $N_D$ is defined as the number of deferrals which have occurred prior to the transmission of the current data packet.

As illustrated best in FIGS. 13(a) and (b) prior to the transmission of a new data packet, the variable G is adjusted, as follows:

If the number of bits set (i.e. equal to 1) in the eight bit register "C" is greater than 2, then all bits in the four bit shift register defining "G" are shifted to the left [least significant bit (LSB) toward most significant bit (MSB)] one bit. In addition, $G_0$ (the least significant bit of four bit shift register G) is set to 1 and the eight bits comprising C are set to 0.

If the number of bits set in the eight bit register "C" is less than or equal to 2, then D is examined, and if the number of bits set in "D" is less than 2, then the present invention shifts the contents of G right (MSB toward LSB) one bit; sets $G_3$ (MSB of G) equal to 0 and sets the value of D equal to 255.

Once G has been adjusted, the present invention then shifts the contents of registers D and C left one bit (toward MSB) and sets the least significant bit (LSB) of C and D equal to 0. Similarly, variables $N_C$ and $N_D$ which denote the number of collisions and deferrals for the particular message to be sent are also set equal to 0. Moreover, as shown in FIG. 13, the value of L is then set equal to the value of G.

Prior to beginning the front end wait sequence disclosed in FIG. 8(a), the present invention determines whether or not a flag detect (i.e. flag byte) has been detected along cable 32. In the event that no flag byte has been detected, the present invention then executes the sequence of operations illustrated in FIG. 8(a) for the front end waiting period. Subsequent to the fixed front end wait sequence, the present invention generates a random number "r" within a predetermined range, and then calculates the value of "R" by logically "AND"ing the value of r with the previously determined value of L (local mask variable). Once the value of R is determined, the present invention then follows the random wait cycle illustrated in FIG. 8(b), and upon completion of the random waiting period, transmits the RTS frame as shown in FIG. 13(b).

If the CTS frame is received by the sending agent within the IFG period, as previously discussed, then the data frame is transmitted, and the message dialogue has been completed. If, on the other hand, a flag is detected prior to the beginning of the front end wait sequence, a deferral adjustment is provided wherein $D_0$ (the LSB of register D) is set to 1 and $L_0$ is set to 1. In addition, the deferral adjustment includes the setting of $N_D$ equal to $N_D + 1$. The flag detect (hunt bit) is once again checked. As shown in FIG. 13, this deferral adjustment occurs in cases where it is determined that the line is busy prior to transmission.

In the event the RTS/CTS handshake is not successful, then a collision is presumed and a collision adjustment occurs. $C_0$ is set equal to 1 and the value of L is shifted left (LSB to MSB) one bit. In addition, $L_0$ is set equal to 1 and $N_C$ is set equal to $N_C + 1$, as illustrated in FIG. 13(b).

It has been found that the utilization of the steps illustrated in FIG. 13 dynamically adjust the randomly generated value of r such that the period of time (in 100 microsecond increments) which an agent waits in addition to the front end waiting period prior to attempting a transmission is modified in accordance with recent cable traffic history. This modification of the random waiting period significantly increases the probability of a successful RTS/CTS frame exchange, and thereby avoids collisions along cable 32.

Accordingly, apparatus and methods have been disclosed having particular utility when used in conjunction with a local area network. The present invention provides a network which permits any agent to be coupled to the cable at any point, and assign itself a unique address. In addition, the present invention's novel collision avoidance protocol minimizes the probability of collisions occurring on the cable, and if a collision occurs, provides a greater probability of success for subsequent re-transmissions.

Although the present invention has been described particularly with reference to FIGS. 1-13, it will be apparant to one skilled in the art that the present invention has utility far exceeding that disclosed in the Figures. It is contemplated that many changes and modifications may be made, by one of ordinary skill in the art, without departing from the spirit and scope of the invention as disclosed above.

We claim:

1. A communication medium for transferring data between a plurality of data processing devices ("agents") including a sending agent and a receiving agent, comprising:

sensing means coupled to said sending agent for therein if said medium is currently carrying data of another agent and is thereby in use;

timing means coupled to said sending agent for timing a first predetermined waiting period once said medium is idle and available for use;

first random number generating means coupled to said sending agent for generating a random number within a predefined range corresponding to a second waiting period prior to transmittng data on said communication medium to said receiving agent;

first signal generation means coupled to said sending agent for generating a first signal and transmitting said signal to said receiving agent;

signal receiving means coupled to said sending agent for receiving a signal transmitted from said receiving agent to said sending agent within a second predetermined time (IFG) after said sending agent has transmitted said first signal;

data transmission means coupled to said sending agent for transmitting data to said receiving agent within said IFG time after receiving said signal from said receiving agent;

whereby data is transferred between said sending and receiving agents coupled to said communication medium.

2. The communication system as defined by claim 1, further including collision assumption means coupled to said sending agent for producing a collision signal in the absence of the receipt of said signal from said receiving agent by said signal receiving means within said IFG time.

3. The communication system as defined by claim 2, wherein said random number (R) is generated by said random number generating means such that:

$$R = r \wedge L$$

where:
r = a random number within said predefined range;
∧ denotes a logical AND operation;
L = a Local variable representative of the collision and deferral history of said sending agent for said data to be sent.

4. The communication system as defined by claim 3, further including a global mask variable G which is representative of the collision and deferral history of said sending agent for all previous data transferred, said variable G being adjusted prior to the initiation of each new data transfer.

5. The communication system as defined by claim 2, wherein said sensing means includes pulse detection means for detecting a synchronization pulse on said communication medium, said synchronization pulse preceeding other signals transmitted by agents coupled to said communication medium.

6. The communication system as defined by claim 5, wherein said synchronization pulse preceeds said other signals by at least 2 bit times.

7. The communication system as defined by claim 5, wherein said first signal comprises an RTS frame including at least one sychronization flag byte having a predefined bit sequence and a type field containing an RTS byte.

8. The communication system as defined by claim 7, wherein said sensing means includes means for sensing said flag byte, the sensing of said flag bytes denoting that said medium is in use.

9. The communication system as defined by claim 8, wherein said signal received from said receiving agent by said receiving means comprises a CTS frame including at least one synchronization flag byte and a type field containing a CTS byte.

10. The communication system as defined by claim 9, wherein said data transmitted by said sending agent is in the form of a data frame including a plurality of data bytes preceded by at least one synchronization flag byte, a destination address and a source address byte.

11. The communication system as defined by claim 10, wherein said data frame further includes a frame check sequence (FCS) and an abort sequence of bits following said plurality of data bytes.

12. The communication system as defined by claim 11, wherein said IFG time is generally 200 microseconds.

13. The communication system as defined by claim 12, wherein said sensing means includes a Z8530 SCC serial communication controller device.

14. The communication system as defined by claim 11, wherein said communication medium comprises a twisted pair cable.

15. The communication system as defined by claim 14, wherein said twisted pair cable is terminated by 100 Ohm resistors.

16. The communication system as defined by claim 11, wherein said data transfers on said communication medium are separated by a third predetermined time (IDG).

17. The communication system as defined by claim 16, wherein said third predetermined time is generally 400 microseconds.

18. The communication system as defined by claim 17, wherein said signals are transmitted on said communication medium using FM-0 encoding.

19. A method for transferring data on a data communication medium between a plurality of data processing devices ("agents"), including a sending agent and a receiving agent, comprising the steps of:

sensing said medium to determine if said medium is currently carrying data of another agent and is thereby in use;

waiting a first predetermined time after sensing that said medium is idle and available for use;

generating a random number within a predefined range corresponding to an additional waiting time prior to transmitting data on said communication medium to said receiving agent;

transmitting a first signal to said receiving agent coupled to said communication medium;

receiving a signal transmitted from said receiving agent to said sending agent within a second predetermined time (IFG) after said sending agent has transmitted said first signal;

transmitting data to said receiving agent within said IFG time after receiving said signal from said receiving agent;

whereby data is transferred between said sending and receiving agents coupled to said communication medium.

20. The method as defined by claim 19, further including the step of producing a collision signal in the absence of the receipt of said signal from said receiving agent within said IFG time.

21. The method as defined by claim 20 wherein said step of generating a random number (R) for said additional waiting time includes the calculation:

$$R = r \wedge L$$

where:
- r = a random number within said predetermined range;
- $\wedge$ denotes a logical AND operation;
- L = a local variable representative of the collision and deferral history of said sending agent for said data to be sent.

22. The method as defined by claim 21, wherein said random number generating step includes:
a global mask variable G which is representative of the collision and deferral history of said sending agent for all previous data transferred, said variable G being adjusted prior to the initiation of each new data transfer.

23. The method as defined by claim 22, wherein G is comprised of 4 bits and variables C and D are defined wherein C is composed of bits representative of the number of collisions assumed for prior attempts to transmit said data, and D is comprised of bits representative of the number of deferrals for prior attempts to send said data.

24. The method as defined by claim 23, wherein said variable G is adjusted such that if the number of bits in C equal to 1 is greater than 2, then:
(a) the bits comprising G are shifted 1 bit toward the most significant bit (MSB);
(b) set $G_0 = 1$;
(c) set all C bits = 0.

25. The method as defined by claim 24, wherein G is adjusted such that if the number of bits set equal to 1 in D is less than 2 then:
(a) the bits of G are shifted one bit toward the least significant bit (LSB);
(b) set $G_3 = 0$;
(c) set D = 255.

26. The method as defined by claim 25, wherein in the event said collision signal is generated:
(a) $C_0 = 1$ (LSB of C);
(b) bits comprising L are shifted 1 bit toward MSB;
(c) $L_0 = 1$
(d) $N_C = N_C + 1$,
where $N_C$ = number of collisions for prior attempts to transmit said data.

27. The method as defined by claim 26, wherein in the event of a deferral, D is adjusted such that:
(a) $D_0 = 1$;
(b) $L_0 = 1$;
(c) $N_D = N_D + 1$,
where $N_D$ = number of deferrals for prior attempts to transmit said data.

28. The method for transferring data as defined by claim 20, wherein said sensing step includes detecting a synchronization pulse on said communication medium, said synchronization pulse preceeding other signals transmitted by agents coupled to said bus.

29. The method for transferring data as defined by claim 28, wherein said synchronization pulse preceeds said other signals by at least 2 bit times.

30. The method for transferring data as defined by claim 28, wherein said first signal comprises a RTS frame including at least one synchronization flag byte having a predefined bit sequence and a type field containing an RTS byte.

31. The method for transferring data as defined by claim 30, wherein said sensing step senses said flag byte, the sensing of said flag byte denoting that said medium is in use.

32. The method as defined by claim 31, wherein said signal received from said receiving agent comprises a CTS frame including at least one synchronization flag byte and a type field containing a CTS byte.

33. The method as defined by claim 32, wherein said data transmitted by said sending agent is in the form of a data frame including a plurality of data bytes preceeded by at least one synchronization flag byte, a destination address and a source address byte.

34. The method as defined by claim 33, wherein said data frame further includes a frame check sequence (FCS) and abort sequence of bits following said plurality of data bytes.

35. The method as defined by claim 34, wherein said data IFG time is generally 200 microseconds.

36. The method as defined by claim 35, wherein said data transfers on said communication medium are separated by a third predetermined time (IDG).

37. The method as defined by claim 36, wherein said signals are transmitted on said communication medium using FM-0 encoding.

38. A data processing device coupled to a communications medium having a number of other devices coupled thereto, the devices each responding to an address, the medium for transferring data between the device and one of the other devices wherein the device is addressable by the other devices coupled to the medium in response to a unique self assigned address, the self assigned address determined by the device transmitting a first tentative address on the medium and, if no other device responds, assigning the tentative address as its address, if another device does respond transmitting other tentative addresses until one is not responded to and assigning that tentative address as its address.

* * * * *

UNITED STATES PATENT AND TRADEMARK OFFICE
CERTIFICATE OF CORRECTION

PATENT NO. : 4,661,902
DATED : 04/28/87
INVENTOR(S) : Hochsprung et al.

It is certified that error appears in the above-identified patent and that said Letters Patent is hereby corrected as shown below:

| COLUMN | LINE | |
|--------|------|---|
| 05 | 01 | insert --)-- after "flag" |
| 11 | 06 | delete "therein" insert --determining-- |

Signed and Sealed this

Fifth Day of December, 1989

Attest:

JEFFREY M. SAMUELS

Attesting Officer     Acting Commissioner of Patents and Trademarks